(12) United States Patent
Guenter

(10) Patent No.: US 7,648,608 B2
(45) Date of Patent: Jan. 19, 2010

(54) METHOD FOR PRODUCING A MULTILAYER COEXTRUDATE AND A FILM STRUCTURE PRODUCED BY THIS METHOD

(75) Inventor: Walter Guenter, Forchheim (DE)

(73) Assignee: Huhtamaki Forchheim Zweigniederlassung der Huhtamaki Deutschland GmbH & Co. KG, Forchheim (DE)

( * ) Notice: Subject to any disclaimer, the term of this patent is extended or adjusted under 35 U.S.C. 154(b) by 0 days.

(21) Appl. No.: 10/275,029

(22) PCT Filed: Apr. 6, 2001

(86) PCT No.: PCT/EP01/03919

§ 371 (c)(1),
(2), (4) Date: Oct. 31, 2002

(87) PCT Pub. No.: WO01/83212

PCT Pub. Date: Nov. 8, 2001

(65) Prior Publication Data

US 2004/0013838 A1    Jan. 22, 2004

(30) Foreign Application Priority Data

May 2, 2000    (DE) ............................... 100 21 109

(51) Int. Cl.
*B32B 27/00* (2006.01)
*B29C 47/00* (2006.01)
(52) U.S. Cl. .............. 156/244.11; 156/242; 156/244.12
(58) Field of Classification Search ................ 156/242, 156/244.11, 244.12; 428/220, 332, 343, 428/457, 461, 500, 511, 519, 537.5
See application file for complete search history.

(56) References Cited

U.S. PATENT DOCUMENTS

| 4,339,485 A | | 7/1982 | Shibano et al. ............. 428/41.3 |
| 4,837,088 A | * | 6/1989 | Freedman .................... 156/243 |
| 4,925,714 A | | 5/1990 | Freedman ................... 428/41.9 |
| 5,700,571 A | * | 12/1997 | Logue et al. ................. 428/352 |
| 5,807,632 A | * | 9/1998 | Pedginski et al. ........... 428/352 |
| 5,866,222 A | * | 2/1999 | Seth et al. .................. 428/41.4 |
| 5,985,079 A | | 11/1999 | Ellison .................. 156/244.23 |

FOREIGN PATENT DOCUMENTS

| DE | 198 51 104 | | 5/2000 |
| DE | 198 51 105 | | 5/2000 |
| JP | 58 113283 | | 7/1983 |
| JP | 59 122570 | | 7/1984 |
| WO | WO 95 33013 | | 12/1995 |
| WO | WO 95/33013 | * | 12/1995 |
| WO | WO 96 40519 | | 12/1996 |
| WO | WO 00 13887 | | 3/2000 |

* cited by examiner

*Primary Examiner*—Sheeba Ahmed
(74) *Attorney, Agent, or Firm*—Collard & Roe, P.C.

(57) ABSTRACT

The invention relates to a method for producing a multilayer coextrudate, comprising a plastic layer that has release properties vis-vis adhesives, the release-property producing materials being disposed in the plastic layer. When the coextrudate is produced, a first web(support web I) is provided on the one side of which an adhesive layer is disposed, followed by the plastic layer having the release properties, which in turn is linked with a second web (support web II). The release layer does not show substantial migration with respect to the adhesive and the release effect does not substantially change afterwards, especially during storage.

33 Claims, 1 Drawing Sheet

METHOD FOR PRODUCING A MULTILAYER COEXTRUDATE AND A FILM STRUCTURE PRODUCED BY THIS METHOD

BACKGROUND OF THE INVENTION

The invention relates to a process for the production of a multilayer coextrudate with a plastic layer that has release properties with respect to adhesives, where the materials producing the release properties are located within the plastic layer.

The Japanese patent application 59-122570 discloses a process in which a layer of adhesive and a release layer are coextruded, i.e. they are combined within an extruder die and leave this die as a web. A substrate web that is extruded from a separate die gap is then laminated onto the side with the layer of adhesive.

BRIEF SUMMARY OF THE INVENTION

Working on the basis of this, the purpose of the invention is to indicate a process of the kind outlined above with which a composite material consisting of a web, an adhesive, a release layer and a further web for the release layer can be produced in an efficient way by the extrusion process.

In the solution to this problem proposed by the invention, a first web (substrate web I) is provided in production of the coextrudate on one side of which a layer of pressure sensitive adhesive is located, after which the plastic layer with the release properties follows, which is in turn bonded to a second web (substrate web II), where the release layer does not exhibit any material migration with respect to the adhesive and the release properties only change insignificantly afterwards, particularly during storage.

At least the basic structure of the film structure is produced in a single operation by this coextrusion process, with a substrate web being provided not only for the layer of pressure sensitive adhesive but also for the release layer.

It has proved to be particularly favorable in this context if in accordance with a further development of the invention the layers of the coextrudate, including, for example, the substrate web, the pressure sensitive adhesive and the release layer are coextruded simultaneously.

Particularly efficient production of the entire layer structure is achieved as a result.

In the process according to the Japanese application 59-122570, however, only the layer of adhesive and the release layer are coextruded, while the substrate web for the layer of adhesive has to be cooled first—which is done between two cooling rollers before it is laminated to the layer of adhesive.

In a further advantageous development of the invention, the other layers are extruded onto at least one of the substrate webs I or II.

It is, however, also possible in accordance with a further development of the invention that the layer of adhesive and the release layer are extruded between two webs.

In a particularly advantageous development of the invention, the layers are extruded simultaneously by the blown film process.

It is, however, also possible in accordance with an advantageous further development of the invention that the release layer and the layer of adhesive are coextruded by the blown film process, with the release layer forming the inner layer, and that these two layers are then collapsed and are bonded on each of their two outsides with one substrate layer for the layer of adhesive.

When the collapsed webs have been separated, the release layer is then provided with a substrate layer too.

In another advantageous development of the invention, the layer of adhesive, the release layer and a substrate web for one of the two layers are produced together by the blown film process, in which the substrate web is preferably provided on the inside and the layer structure is subsequently collapsed and bonded on both sides with a further substrate web.

In these configurations it must only be made sure that the layer of adhesive is not located so that it is free on the inside.

It is, however, also possible in accordance with a further development of the invention that the layers are produced by the cast film process.

In accordance with a further advantageous development of the invention, it is possible that a pre-produced web, to which the other layers are extruded in a single process operation, is provided as the substrate web.

This process is particularly favorable especially when a web is being used that is difficult or impossible to extrude at the same time, as all the other layers can be applied to the web that is acting as the substrate web in a single operation.

It is also very advantageous if in accordance with a farther development of the invention a plastic film, to which the other layers are extruded in a single process operation, is provided as the substrate web.

A further advantageous development of the invention is characterized by the fact that at least the substrate web is oriented.

The coextrudate receives favorable strength properties as a result.

It is also possible in accordance with an advantageous development of the invention that the entire film structure is oriented.

All the layers that can be oriented can help to increase the strength properties in this case.

An advantageous development of the process proposed by the present invention is characterized by the fact that the layer of adhesive and the release layer are coordinated with each other in such a way that the adhesive force is reduced by the release properties of the release layer to a minimal extent at most, as material migration of the components of the release layer into the adhesive is avoided.

In accordance with a further development of the invention, the reduction in adhesive force as measured by FINAT methods is supposed to be less than 20%.

This guarantees that the adhesive force does not decrease excessively and is no longer adequate for the planned application.

In accordance with an advantageous development of the invention, the release force between the release layer and the layer of adhesive is supposed to be between 5 and 50 cN/cm.

The main way this is achieved in accordance with a further advantageous development of the invention is that the release effect has been built up almost entirely when the extrusion process is carried out.

In a further advantageous development of the invention, the release layer is are produced using silicone graft and/or block copolymers.

The desired low migration of the components of the release layer into the neighboring layer of adhesive is achieved by these properties of the release layer.

In a further advantageous development of the invention, the release effect of the release layer is set in relation to the neighbouring adhesive during the extrusion process.

In accordance with an advantageous development of the invention, the adhesive force of the layer of adhesive can also be adapted to the subsequent application for the layer of adhesive with the relevant substrate web.

Depending on the planned application, the adhesive force is supposed to be set in a range from 1 to 20 N/25.4 mm, measured by AFERA methods, in accordance with a further development of the invention.

1 to 4 N/25.4 mm are planned in this context for what are known as protective films, 5 to 10 N/25.4 mm for adhesive tapes and >10 N/25.4 mm for permanent labels.

Acrylate adhesives and/or rubber-based pressure sensitive adhesives are used as adhesives in accordance with an advantageous development of the invention.

In accordance with another advantageous development of the invention, thermoplastic elastomers—preferably styrene types such as SBS or SEBS—are used as adhesives, with which tackifiers (e.g. resins) are mixed during the extrusion process to control the adhesive properties.

It is also possible in accordance with a further development of the invention that elastomer blends such as EPDM/PP are used as adhesives, with which tackifiers (e.g. resins) are mixed during the extrusion process to control the adhesive properties.

In another advantageous development of the invention, metallocene catalyzed polyolefins with a density of <0.880 g/cm$^3$ are used as adhesives with the addition of tackifiers during the extrusion process.

In accordance with an advantageous development of the invention, a multilayer film structure has two substrate webs, between which a layer of adhesive and a release layer are located, where these two layers bond considerably more strongly to the substrate webs facing them than they do to each other.

The layer of adhesive and the release layer have solely their relevant function here without any significant support properties; these support properties are provided exclusively by the two substrate webs.

An advantageous further development of the film structure proposed by the present invention is characterized by the fact that at least two plastic films are provided, between which a layer of adhesive and a further layer that has release properties with respect to the adhesive are located.

In a further advantageous development of the invention, further layers are provided that are located on either one or both sides of the plastic films.

It has proved to be very advantageous if in accordance with a further development of the invention at least part of the coextrudate structure is oriented.

Considerable increases in strength are achieved by orienting the substrate web or the finished coextrudate.

It has also proved to be very advantageous if at least one of the substrate webs is made from paper.

It is, however, also possible in accordance with a further advantageous development of the invention if at least one of the substrate webs is made from metal.

At least one of the substrate webs can, however, be made from a pre-produced composite film as well, in accordance with a further advantageous development of the invention.

In a further advantageous development of the invention, at least one of the substrate webs is made from a nonwoven fabric.

In accordance with an advantageous development of the invention, the substrate web for the release layer is supposed to have a material thickness of 20 to 80μ.

A material thickness of 60 to 200μ is, on the other hand, contemplated for the substrate layer for the pressure sensitive adhesive layer.

BRIEF DESCRIPTION OF THE DRAWINGS

Accompanying the specification are figures which assist in illustrating the embodiments of the invention, in which.

Figure 1:
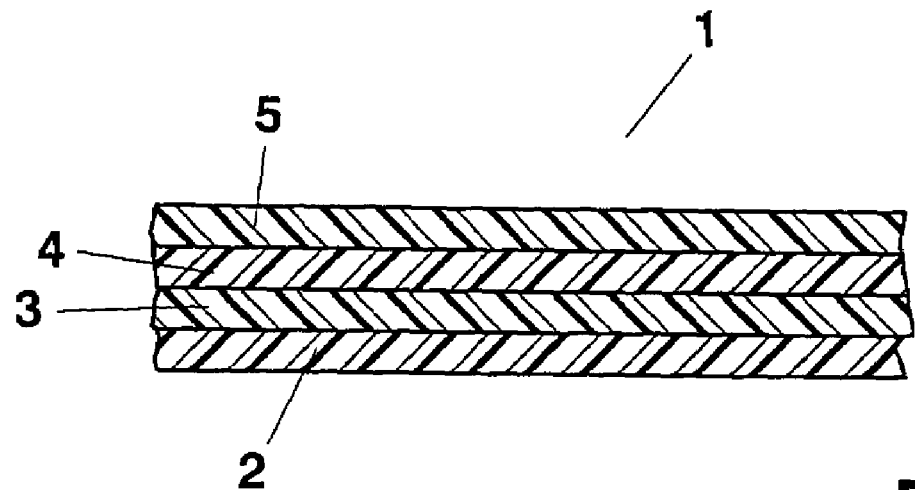
FIG. 1 is a diagrammatic view of the structure of a film structure that consists of four layers.

DETAILED DESCRIPTION OF THE INVENTION 1 in FIG. 1 is a film structure that consists of four layers and has been produced by the coextrusion process, i.e. all four layers were combined within an extrusion die.

A layer of adhesive 3, next to which a further layer 4 that has release properties with respect to the adhesive is located, is provided on one side of the first web 2. This release layer 4 is in turn bonded to a second web 5 (substrate web). This release layer 4 is a plastic to which agents with release properties have been added.

If both of the webs 2 and 5 are made from a coextrudable plastic, all four layers can be produced simultaneously, not only by the blown film process but also by the cast film process.

It is, however, also possible to coat the web 2 or the web 5 with the other layers subsequently by the coextrusion process.

Figure 2:
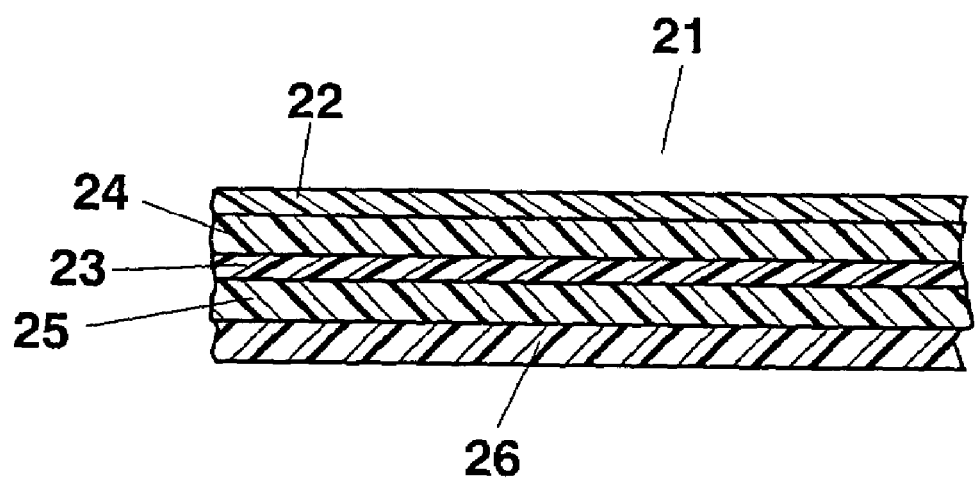
FIG. 2 shows a further film structure consisting of five layers, again in a diagrammatic view.

FIG. 2 shows a further film structure 21 that consists of five layers. What is involved here is a web 22 that acts as the substrate layer for a release layer 24. This release layer 24 faces a layer of adhesive 23 that is bonded to a web 25 made of plastic. This web 25, which acts as the core layer, has a surface layer 26 on its side facing away from the layer of adhesive 23. Such a surface layer can also be provided on the web 22 that acts as the substrate layer for the release layer.

Different plastics can be used as the substrate layer for the release layer.

Good properties have, for example, been achieved with LDPE, LLDPE, HDPE, PP, mPE, PETP and PS, in each case 20 to 40μ thick, while the actual release layer was 5 to 10μ thick.

PP, OPP, PE, LDPE, LLDPE, mPE, PS and PET have been used very successfully for the web that supports the adhesive, with material thicknesses between 60 and 200μ, depending on the material used. This web has in some cases been provided with an additional coating on the outside to improve printability.

The webs have in some cases been divided up into several individual layers made from different materials too.

Extrudable, permanently tacky adhesives based on pressure sensitive adhesives and polyolefins with appropriate tackifying additives have been used successfully as adhesives.

EXAMPLE 1

Use of SIS, SBS and SEBS block copolymers with melt indices of between 8 and 65 g/10 min at 200° C. and 5 kg. The styrene content of the polymers varies between 10 and 35%. The properties of the adhesive layer are controlled by the addition of resins and plasticisers, e.g. by means of aliphatic hydrocarbon resins, polyterpene resins, hydrolysed hydrocarbon resins, aromatic hydrocarbon resins, paraffin waxes, microcrystalline waxes, polyisobutylene and process oils.

Liquid components are processed into an extrudable form by carrying out a compounding operation first.

The extrusion temperatures vary between 100 and 240° C., avoiding excessively high shear forces at the same time.

EXAMPLE 2

Another way to produce the adhesive layer involves the inclusion of UV acrylates or UV-curing PSAs between the coextruded substrate and release layers by using melt transport technology.

The radiation-cured basic materials are, for example, acrylate copolymers with an integrated photoinitiator. UV cross-linking is carried out by the polymer substrate layer for the adhesive.

The acrylate copolymers can be modified by resins and plasticisers, while the tack of the adhesive layer can be regulated via the radiation dose.

Typical radiation wavelengths for cross-linking purposes are in the range between 250 and 260 mm (UVC).

Typical processing temperatures for the acrylate copolymers are between 110 and 150° C.

If a substrate web is used that is coated by the coextrusion process, it is possible to orient not only the substrate web alone but also the finished coextrudate in order to increase the strength properties.

If the entire structure is produced as a coextrudate, this coextrudate can also be oriented subsequently to increase the strength properties.

Orientation is only possible to a limited extent if substrate webs made from paper, nonwoven fabric or metal are being used.

If a pre-produced composite film is, on the other hand, used as the substrate web, orientation to increase strength is generally possible, depending on the material it contains.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

The invention claimed is:

1. A process for the production of a multilayer coextrudate having a plastic release layer located against and releasable from a pressure-sensitive adhesive, the process comprising the steps of:
   extruding a first substrate web; and
   combining a second substrate web, a pressure-sensitive adhesive layer and a plastic release layer comprising at least one release agent, said at least one release agent comprising a silicone graft copolymer or silicone block copolymer, within a single extrusion die and coextruding the second substrate web, the pressure-sensitive adhesive layer and the plastic release layer simultaneously through said single extrusion die;
   wherein the second substrate web is bonded to the plastic release layer and the layer of pressure-sensitive adhesive is disposed on one side of the first substrate web; and
   wherein the at least one release agent of the plastic release layer does not migrate into the pressure-sensitive adhesive layer, and the release properties of the plastic release layer against the pressure-sensitive adhesive are stable against aging.

2. The process of claim 1, wherein other layers are extruded onto at least one of the first and second substrate webs.

3. The process of claim 2, wherein the adhesive layer and the release layer are extruded between the first and second substrate webs, and the adhesive layer, release layer and first and second substrate webs are coextruded simultaneously.

4. The process of claim 1, wherein the adhesive and release layers and the second substrate web are extruded simultaneously by a blown film extrusion process.

5. The process of claim 1, wherein the release layer and the layer of adhesive are coextruded by a blown film extrusion process along with the second substrate web, with the release layer forming an inner layer, and wherein the release and adhesive layers are then collapsed and a further substrate web is bonded on both sides of the collapsed coextrudate.

6. The process of claim 5, wherein a layered structure comprising the layer of adhesive, the release layer, and the second substrate web is produced together by a blown film extrusion process.

7. The process of claim 1, wherein the multilayer coextrudate is produced by a cast film extrusion process.

8. The process of claim 1, wherein the first substrate web is a pre-produced web, onto which other layers comprising the release layer, the adhesive layer and the second substrate web are extruded in a single process operation.

9. The process of claim 8, wherein at least one of the first substrate web is a plastic film, onto which other layers of the multilayer coextrudate are extruded in a single operation.

10. The process of claim 1, wherein at least one of the first and second substrate webs is oriented.

11. The process of claim 10, wherein the entire multilayer coextrudate is oriented.

12. The process according to claim 1, 2, 3, 4, 5, 6, 7, 8, 9, 10 or 11, wherein the layer of adhesive and the release layer are placed adjacent to each other such that material migration of the release layer into the adhesive layer does not substantially occur.

13. The process of claim 12, wherein there is a less than 20% reduction in adhesive force, as measured by FINAT methods.

14. The process of claim 1, wherein a release force between the release layer and the layer of adhesive is between 5 and 50 cN/cm.

15. The process of claim 12, wherein a release effect of the release layer is substantially completely established during extrusion.

16. The process of claim 1, wherein release effect of the release layer is established relative to the adjacent pressure sensitive adhesive layer during extrusion.

17. The process of claim 1, wherein an adhesive force of the layer of adhesive is determined by subsequent application of the first substrate web to the layer of adhesive.

18. The process of claim 17, wherein the adhesive force is from 1 to 20 N/25.4 mm, as measured by AFERA methods.

19. The process of claim 1, wherein the adhesive is selected from the group consisting of acrylate and hotmelt adhesives.

20. The process of claim 1, wherein the adhesive is a thermoplastic elastomer with which at least one tackifier is mixed during extrusion.

21. The process of claim 1, wherein the adhesive is an elastomer blend, and at least one tackifier is mixed therewith during extrusion.

22. The process of claim 1, wherein the adhesive is a metallocene catalysed polyolefin, and at least one tackifier is added thereto during extrusion.

23. The process of claim 22, wherein the metallocene catalysed polyolefin has a density of less than 0.880 g/cm$^3$.

24. A multilayer coextruded film produced according to the process of claim 1, wherein the layer of adhesive and the release layer are bonded to each other and are, in turn, bonded between and respectively to the first and second substrate webs, such that a bond strength between the adhesive layer and the first substrate web, and the bond strength between the release layer and the second substrate web, are each greater than a bond strength between the adhesive layer and the release layer.

25. A multilayer coextruded film produced according to the process of claim 1, wherein the substrate webs comprise plastic films, between which there are an adhesive layer and a layer having release properties with respect to the adhesive layer.

26. The multilayer coextruded film of claim 24 or 25, wherein further layers located on at least one side of at least one of the plastic films, are provided.

27. The multilayer coextruded film of claim 24 or 25, wherein at least part of the multilayer coextrudate is oriented.

28. The multilayer coextruded film of claim 24 or 25, wherein at least one of the first and second substrate webs is a pre-produced composite film.

29. The multilayer coextruded film of claim 24 or 25, wherein the second substrate web for the release layer has a material thickness of 20 to 80 μm.

30. The multilayer coextruded film of claim 24 or 25, wherein the first substrate web for the adhesive layer has a material thickness of 60 to 200 μm.

31. The process of claim 6, wherein the first substrate web is provided on an inside of the multilayered coextrudate, which is produced as a film by a blown film extrusion process, and the multilayered coextrudate film is subsequently collapsed, and is then bonded on both sides thereon with the second substrate web.

32. The process of claim 21, wherein the elastomer blend is ethylene-propylene-diene monomer/polypropylene.

33. A process for the production of a multilayer coextrudate having a plastic release layer located against and releasable from a pressure-sensitive adhesive, the process comprising the step of:
combining a first substrate web having a layer of pressure-sensitive adhesive disposed on one side thereof, and a second substrate web bonded to a plastic release layer, wherein at least one of silicone graft copolymers or block copolymers are used to produce a release property in the plastic release layer, within a single extrusion die and coextruding the first substrate web, the layer of pressure-sensitive adhesive, the second substrate web and the plastic release layer simultaneously through said single extrusion die;
wherein the at least one of silicone graft copolymers or block copolymers used to produce a release property in the plastic release layer do not migrate into the layer of pressure-sensitive adhesive, and the release properties of the plastic release layer against the pressure-sensitive adhesive are stable against aging.

* * * * *